(12) United States Patent
Weisenberg et al.

(10) Patent No.: US 10,486,180 B2
(45) Date of Patent: Nov. 26, 2019

(54) DEVICE AND METHOD FOR MEASUREMENT OF THE THICKNESS OF SPRAYED-ON INTERNAL PIPE LINERS

(71) Applicants: Kent Weisenberg, Fruit Cove, FL (US); Ibrahiim Syed, Jacksonville, FL (US)

(72) Inventors: Kent Weisenberg, Fruit Cove, FL (US); Ibrahiim Syed, Jacksonville, FL (US)

(73) Assignee: SIPP TECHNOLOGIES, LLC, Wichita, KS (US)

( * ) Notice: Subject to any disclaimer, the term of this patent is extended or adjusted under 35 U.S.C. 154(b) by 244 days.

(21) Appl. No.: 15/648,232

(22) Filed: Jul. 12, 2017

(65) Prior Publication Data

US 2018/0326439 A1 Nov. 15, 2018

Related U.S. Application Data

(60) Provisional application No. 62/504,050, filed on May 10, 2017.

(51) Int. Cl.
| | |
|---|---|
| *B05B 12/08* | (2006.01) |
| *G01B 17/02* | (2006.01) |
| *F16L 55/1645* | (2006.01) |
| *F16L 101/16* | (2006.01) |
| *B05B 13/06* | (2006.01) |

(52) U.S. Cl.
CPC ........ *B05B 12/084* (2013.01); *F16L 55/1645* (2013.01); *G01B 17/025* (2013.01); *B05B 13/0636* (2013.01); *F16L 2101/16* (2013.01)

(58) Field of Classification Search
USPC .......................... 118/317, 712, 306, DIG. 10
See application file for complete search history.

(56) References Cited

U.S. PATENT DOCUMENTS

| 2,813,981 A | * | 11/1957 | Friedman | G01B 11/00 250/372 |
| 3,079,888 A | * | 3/1963 | McLean | B05C 7/08 118/408 |
| 2011/0181721 A1 | * | 7/2011 | Bloom | B61K 9/08 348/148 |
| 2015/0140228 A1 | * | 5/2015 | Kersey | B05D 3/067 427/512 |

FOREIGN PATENT DOCUMENTS

JP 2001137752 A * 5/2001

OTHER PUBLICATIONS

English Translation JP2001137752A May 22, 2001 (Year: 2001).*

* cited by examiner

*Primary Examiner* — Yewebdar T Tadesse
(74) *Attorney, Agent, or Firm* — Thomas C. Saitta

(57) ABSTRACT

A method and device for measuring the thickness of a liner applied onto the inner wall of a pipe, the device comprising a sprayer assembly adapted to deposit a polymer resin onto the inner wall of a pipe to create a liner upon curing, the sprayer assembly being moved through the pipe. The sprayer assembly has a leading sensor assembly that measures the inner diameter of the pipe and trailing sensor assembly that measures the inner diameter of the liner. The trailing sensor assembly has a housing with windows through which sensor devices take readings, and a transparent film is disposed across the windows to protect the sensors from occluding contamination. The transparent film is advanced as the exposed portion of the film becomes excessively contaminated.

6 Claims, 4 Drawing Sheets

DEVICE AND METHOD FOR MEASUREMENT OF THE THICKNESS OF SPRAYED-ON INTERNAL PIPE LINERS

This application claims the benefit of U.S. Provisional Patent Application Ser. No. 62/504,050, filed May 10, 2017.

BACKGROUND OF THE INVENTION

This invention relates generally to the field of devices and methods for the rehabilitation and/or lining of pipes or other tubular members wherein a polymer resin or similar uncured polymer material is sprayed onto the interior wall of the pipe, the sprayed material curing to form a layer possessing desirable properties, such as liquid impermeability, elasticity, rigidity, corrosion resistance, etc. The lining layer may be applied directly to the pipe wall itself, or successive layers may be applied to create multiple layers. The invention relates to such devices which comprise a sprayer mechanism that is transported along the interior of the pipe, the sprayer mechanism typically comprising a rotating member that distributes the uncured polymer as it moves linearly along the pipe. More particularly, the invention relates to measuring devices and methods that measure the thickness of the polymer layer applied to the exposed inner surface.

The structural integrity of pipe lining relies on the lining thickness, which makes consistent lining thickness one of the key parameters defining the quality of lining. In Class I and Class II linings (corrosion or 'barrier' coatings) this may not be all that critical, however, in Class III and IV, the structural augmentation is directly reliant on consistent liner thickness. Irregularities in the liner thickness will pave the way for high stress concentration regions, leading to the origin of anomalies in the form of cracks and perforations, which over a period may result in the complete failure of the pipe. Additionally, these pipe failures can lead to huge amount of potable water loss, soil erosion, sink holes in streets, catastrophic and dramatic consequences to the environment and human life if the pipeline effluent is hazardous.

As per the current AWWA and ASTM lining standards, the thickness of the liner applied to the pipe internal wall is verified by one of the following three methods:

First, a Wet Film Thickness Gauge or Ultrasonic Measurement device is used at the two ends of the lined pipe. In this method, the Ultrasonic Device and Wet Film Thickness Gauge can only record the measurements at the pipe ends, only as far as the operator can reach into the pipe while still being able to read the instrument. It is not capable of measuring the thickness at points in the interior of the pipe.

Second, to be able to measure the thickness on multiple long run pipe, the standard is to remove by excavation one small section of pipe in the center of a lining segment for every 2500 feet of pipe lined. This only provides thickness measurements at intermittent regions, not continuously throughout the length of the pipe. For example, if a typical Sprayed-In-Place-Pipe (SIPP) lining application is along a segment of about 500 feet of pipe, the operator is only testing the thickness at each end of the pipe (method 1) and in the middle with excavation and removal of approximately 20 feet of pipe (method 2), so the minimum distance in which no thicknesses are verified can be roughly 480 feet. The issue with all of these 'post' lining thickness verification methods is that there is no way to determine the thickness of the lining in between the measurement points. These standards requirements simply 'assume' that if the lining thickness is correct at both ends or the center then it is correct throughout the pipe. When considering the discontinuities in old worn pipe that directly impede the mechanical efficacy of the lining device, this assumption is simply baseless and without merit.

In a third method to measure the liner thickness along the entire length of pipe, a robotic ultrasound device travels the entire length of pipe and takes readings of the lining thickness after the pipe has been lined and cured. These units are expensive, as well as being highly unreliable and inaccurate.

The main problem with all of these post-cure lining thickness verification methods is that it only informs the operator of a lining thickness fault after the lining has already been applied on the pipe and liner application equipment has been removed. In the event that the lining thickness does not meet specification or requirements the pipe has to be lined again, which is expensive and time consuming. Another issue is that many of the polymerics have a short 'recoat window' so additional lining may not adhere to the existing lining resulting in failure if the time gap between curing and relining is too great.

It is an assumption within the industry that the liner operator is capable of accurately predetermining liner thickness by performing a simple calculation based on pipe diameter, lining device speed and material flow. These three inputs are used to determine liner thickness under the misguided premise that if you know the diameter, speed and flow then you can determine the final lining thickness. There is no account in this calculus whether the lining material is applied in a consistent thickness circumferentially in the pipe or not. While there might be enough material cast inside the pipe at any given point to form a layer, the material may very well be thicker on one side of the pipe than the other, and there is also a possibility of material being slumped into the pipe due to gravity. Currently in the SIPP industry the above-mentioned means of thickness verification are the only means available due to the mechanical functionalities of the lining apparatuses available.

To be able to able to verify the consistency of lining thickness it is essential to have a reliable and accurate method of measuring the lining thickness which can record the measurements with high precision and repeatability, and yet be economical in terms of cost. The object of this invention is to address the above challenges associated with accurate lining thickness measurement by providing a cost effective, reliable and accurate method to measure the thickness of the lining material casted on the host pipe in real time, i.e., virtually simultaneously with the application of the liner material.

SUMMARY OF THE INVENTION

The invention in various embodiments is an improved methodology and device for the Sprayed-In-Place-Pipe (SIPP) process, wherein a polymer resin or similar material in its uncured or partially cured state is circumferentially applied to the interior wall of a pipe or tubular member by an applicator apparatus that is pulled or otherwise transported along the length of the pipe during the spraying operation. In this manner, the polymer resin is deposited and cures into a continuous liner or lining layer adhered to the interior wall of the pipe.

To accurately determine the thickness of the applied layer of polymer resin, two sensor assemblies are provided as part of or adjacent the spinner assembly of the applicator apparatus. One sensor assembly is a leading sensor assembly positioned forward of the spinner assembly (relative to the direction of travel of the applicator apparatus) and the other sensor assembly is a trailing sensor assembly. The leading sensor assembly measures the inner diameter of the pipe wall prior to application of the polymer resin. The trailing sensor assembly measures the inner diameter of the liner immediately after it has been applied to the pipe wall. This information is relayed to a processing unit to calculate the thickness of the liner. With this device and method, the operator knows immediately if the thickness of the lining layer is inadequate.

Application of the polymer resin will result in atomization of the material, such that tiny particles of the material will be suspended in the atmosphere. Furthermore, larger material particles fall from the layer as it is being applied. These material particles may adhere to the sensor heads by passing through open windows in the sensor housing or may adhere to transparent windows positioned over the sensor heads, such that the accuracy of the sensors may be affected or the sensors may become useless due to the contamination. To solve this problem the sensor assemblies are provided with window protective mechanisms comprising an extended length of transparent film that is positioned across the windows. The film extends between a supply reel and a powered accumulator reel which advances the film periodically or in response to the diminishment of sensor accuracy, such that the contaminated section of film is removed and a clean section of film is positioned across the window as needed.

In alternative language, the invention is a method of measuring the thickness of a liner sprayed onto the inner wall of a pipe by an applicator apparatus comprising a sprayer assembly with a spray head, the method comprising the steps of providing a sprayer assembly comprising a spray head, a leading sensor assembly and a trailing sensor assembly, wherein said spray head is adapted to propel a polymer resin material onto the inner wall of a pipe, said polymer resin material curing to form a liner; and further wherein said leading sensor assembly is adapted to measure the inner diameter of the pipe and said trailing sensor assembly is adapted to measure the inner diameter of the liner; advancing said sprayer assembly through the pipe and propelling the polymer resin onto the inner wall of the pipe through said spray head; measuring the inner diameter of the pipe with the leading sensor assembly; measuring the inner diameter of the liner with the trailing sensor assembly; and calculating the thickness of the liner. Furthermore, such a method wherein said leading sensor assembly and said trailing sensor assembly each comprise one or more sensor devices disposed within a housing, said housing having a window associated with each said sensor device, and wherein said trailing sensor assembly further comprises a window protective mechanism, said window protective mechanism covering each of said windows with a movable transparent film; further comprising the step of advancing said transparent films across said windows; wherein said step of advancing said transparent films occurs at periodic time intervals; and/or wherein said step of advancing said transparent films occurs in response to the amount of polymer resin material accumulated on said films.

In alternative language the invention is a sprayer assembly adapted to create a liner on the inner wall of a pipe and measure the thickness of the liner when transported through the pipe, said sprayer apparatus comprising a spray head adapted to propel a polymer resin material onto the inner wall of the pipe, said polymer resin material curing to form a liner on the inner wall of the pipe; a leading sensor assembly mounted forward of said spray head relative to the direction of travel of said sprayer assembly through the pipe; said leading sensor assembly adapted to measure the inner diameter of the pipe; and a trailing sensor assembly mounted to the rear of said spray head relative to the direction of travel of said sprayer assembly through the pipe; said trailing sensor assembly adapted to measure the inner diameter of the liner; whereby the thickness of the liner is determined by calculating the difference between the inner diameter of the pipe and the inner diameter of the liner. Furthermore, such an assembly wherein said leading sensor assembly and said trailing sensor assembly each comprise one or more sensor devices disposed within a housing, said housing having a window associated with each said sensor device; wherein said trailing sensor assembly further comprises a window protective mechanism, said window protective mechanism comprising a movable transparent film extending across each of said windows; and/or wherein said trailing sensor assembly further comprises a supply reel for each of said transparent films and a powered accumulator reel, whereby said powered accumulator reel unwinds said transparent films from said supply reels and advances said transparent films across said windows.

DETAILED DESCRIPTION OF INVENTION

With reference to the drawings, which are provided for descriptive and illustrative purposes and not intended to be limiting as to the scope and definition of the invention, the methodology and the device are now described in detail. The invention may be incorporated into SIPP applicator apparatuses of various design wherein the applicator apparatus, often referred to as a robot applicator, is pulled or powered through the interior of a pipe and continuously applies a circumferential coating of an uncured or partially cured polymer resin or similar material onto the interior of the pipe to create a liner or lining layer upon curing. The term "pipe" is used herein to designate a tubular member, such as for example a concrete or metal pipe, as well as a tubular member defined by a lining previously applied to the interior of another tubular member. Thus, reference to the inner diameter of a pipe may also include the inner diameter of a cured lining layer already present within the actual pipe.

Figure 1:
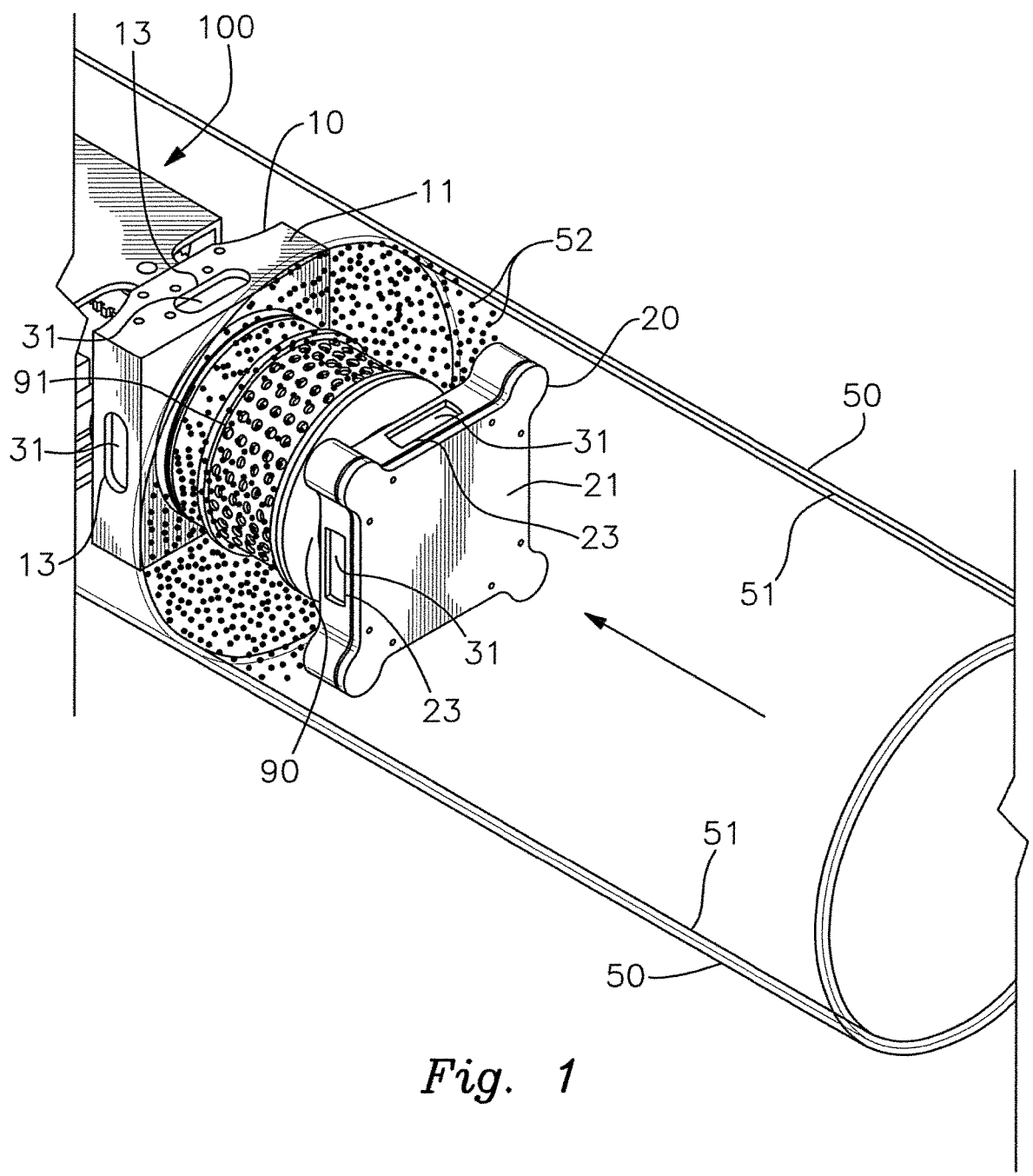
FIG. 1 is a partial perspective view of a representative polymer resin applicator apparatus showing an embodiment of a spinner assembly, the leading sensor assembly and the trailing sensor assembly a moving through a pipe during the lining operation.
Figure 2:
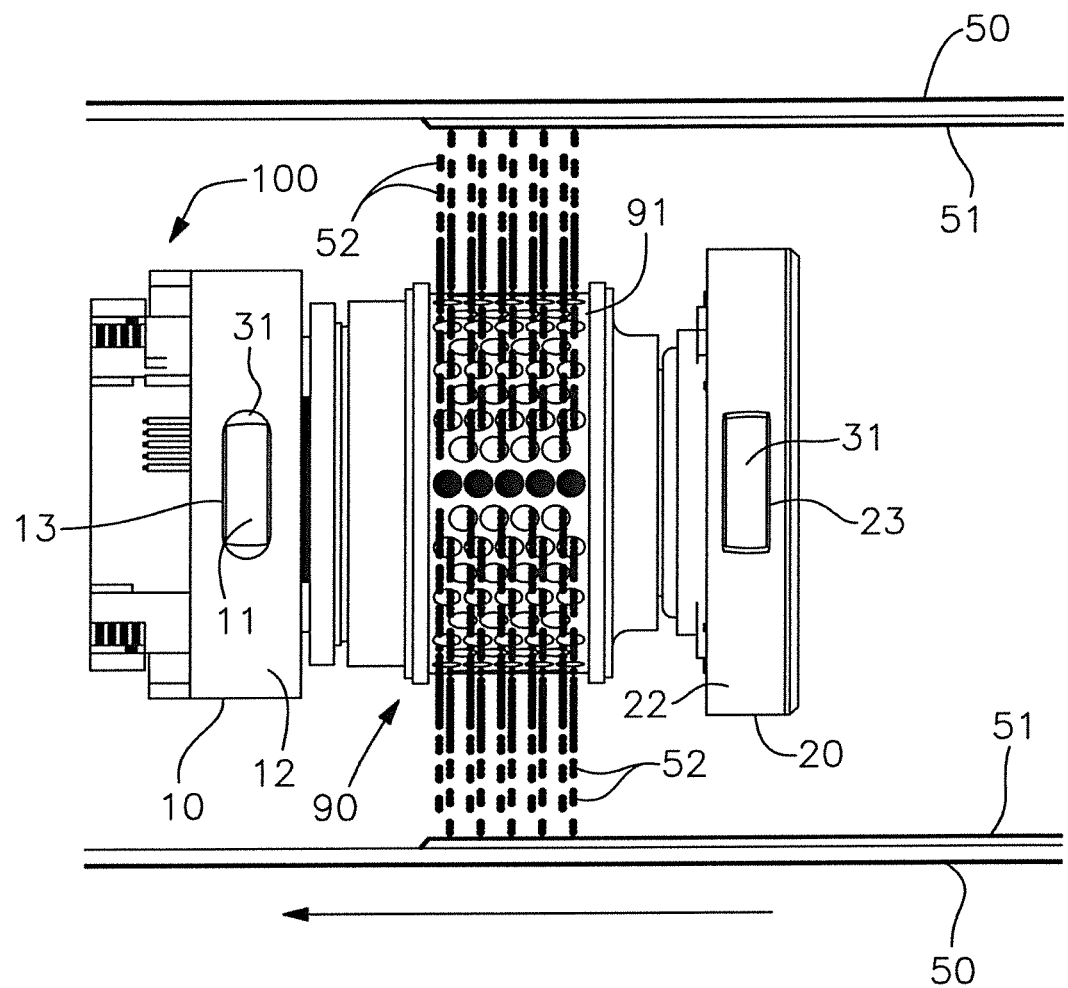
FIG. 2 is a partial side view of the representative polymer resin applicator apparatus of FIG. 1.
Figure 3:
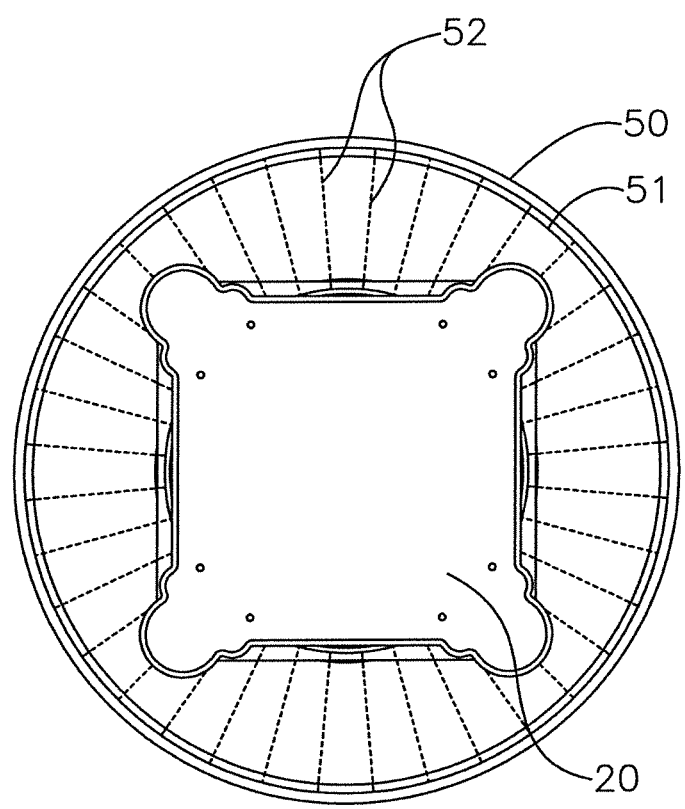
FIG. 3 is an end view of the representative polymer resin applicator apparatus of FIG. 1
Figure 4:
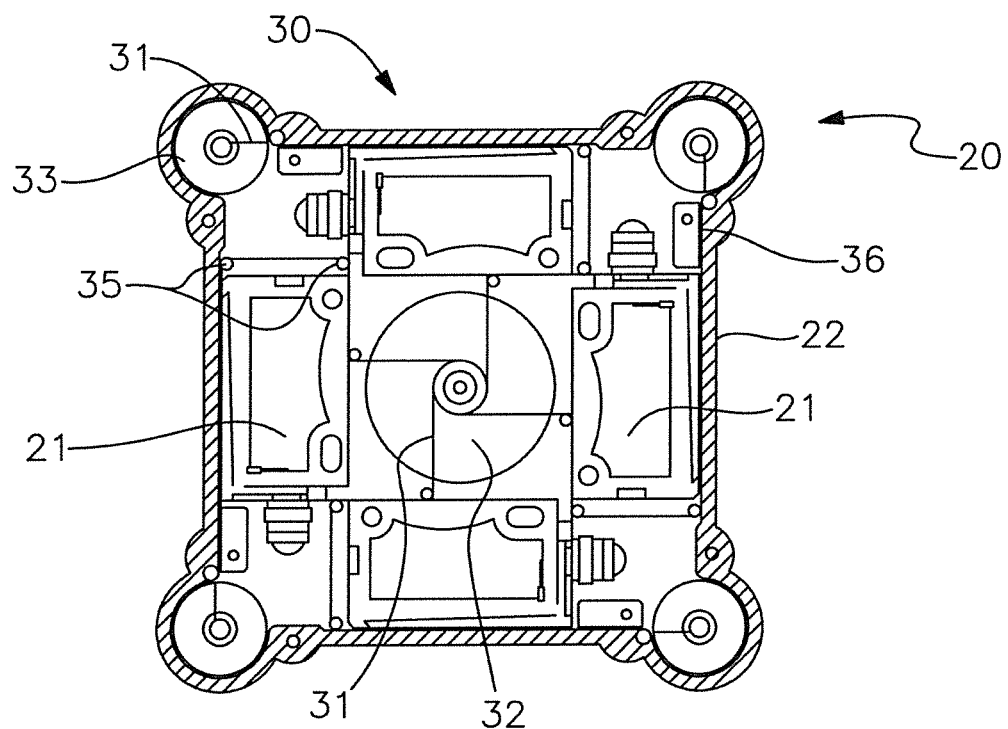
FIG. 4 is an exposed end view of a sensor assembly showing the sensor devices and the window protective mechanism.
Figure 5:
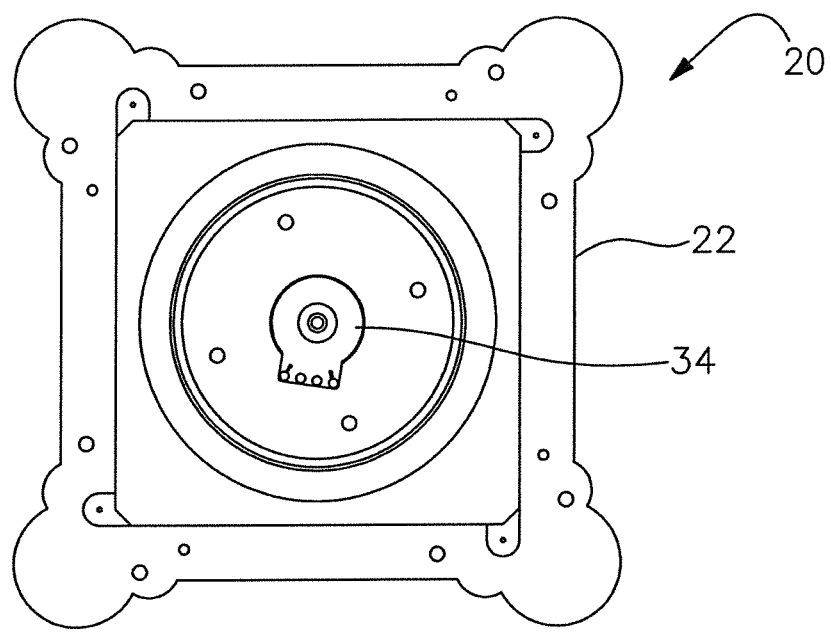
FIG. 5 is an exposed view of the opposite side of the sensor assembly of FIG. 4 showing the accumulator reel motor.

A typical SIPP applicator apparatus 100 comprises in general a mechanism for advancement through the pipe 50 and a mechanism for spraying or coating the inner wall of the pipe 50 with a polymer resin or similar material that rapidly cures in place to form the liner 51. As shown in FIGS. 1-3, a representative applicator apparatus 100 comprises a spinner or sprayer assembly 90 that is mounted so as to occupy a centralized position within the pipe 50 as it moves along. The sprayer assembly 90 receives the uncured or partially cured liner material 52 under pressure and sprays or propels the liner material 52 onto the inner surface of the pipe 50, the sprayer assembly 90 comprising a spray head 91, such as a perforated sleeve or cone that rotates at high speed, the liner material 52 being supplied into and then centrifugally propelled through the spray head 91.

In order to measure the thickness of the lining layer 51 immediately after it has been applied to the inner wall of the pipe 50, the spray head assembly 90 is provided with a leading sensor assembly 10 and a trailing sensor assembly 20. The leading sensor assembly 10 is mounted forward of the spray head 91 relative to the direction of travel (as indicated by arrows in FIGS. 1 and 2) such that it measures the internal diameter of the pipe 50 in order to establish a baseline dimension prior to polymer resin material 52 being sprayed onto that section of the pipe 50. The trailing sensor assembly 20 is mounted to the rear of the spray head 91 relative to the direction of travel such that is measures the internal diameter of the applied liner 51. The difference in these two measurements determines the thickness of the internal liner 51 as applied to the pipe 50.

The sensor assemblies 10/20 comprise at least one and preferably a plurality of sensor devices 11/21 mounted or retained within a housing 12/22, the sensor devices 10/20 being capable of and adapted to measure the inner diameter of a tubular surface, in this case the inner wall of the pipe 50 and the inner wall of the liner 51. Such sensor devices 11/21 are well known. The sensor devices 11/21 are in communication with a processing unit, such as a computer or similar electronic device, via direct hardwire connections through the applicator apparatus 100 or wireless means, such that the information derived from the sensor devices 11/21 can be used to immediately calculate the thickness of the liner 51. The housings 12/22 are provided with windows 13/23 corresponding to the sensor devices 11/21, the windows 13/23 being empty openings or transparent members (e.g., glass or plastic sheets). Leading sensor assembly 10 differs from trailing sensor assembly 20 in that openings, spaces, conduits or the like must be provided for pass-through of electrical, communication and material delivery elements.

In order to increase the accuracy of the device, it is most preferred that a plurality of sensor devices 11/21 be deployed on each sensor assembly 10/20 such that multiple measurements are taken circumferentially around the inner walls of the pipe 50 and liner 51. In a preferred embodiment as shown, each sensor assembly 10/20 is provided with four sensor devices 11/21 associated with four windows 13/23. The sensor devices 11/21 are positioned circumferentially at 90 degrees intervals, such that diameter measurements are taken at four locations on the pipe 50 or liner 51 by each sensor assembly 10/20.

As previously discussed, contamination of solid windows 13/23 or of the sensor devices 11/21 themselves when open windows 13/23 are utilized will often occur as the liner material 52 is propelled from the spray head 91, due to atomization of or physical deposition of the liner material 52 during the application process. Such contamination may be minimal or non-existent for the leading sensor assembly 10, as it precedes the application zone, but is likely to present a significant problem for the trailing sensor assembly 20, since the trailing sensor assembly 20 is immediately moved into the application zone as the applicator apparatus 100 advances.

To address the contamination problem, the trailing sensor assembly 20, and optionally the leading sensor assembly 10, is provided with a window protective mechanism 30. The window protection mechanism 30 is adapted to protect either open or solid windows 13/23. The window protection mechanism 30 comprises multiple strips of transparent film 31, such as a polymer film, with one such film 31 associated with each window 13/23. The film 31 extends between a supply spool or reel 33 and an accumulator spool or reel 32. The supply reels 33 are free spinning, whereas the accumulator reel 32 is powered by a motor 34 or similar mechanism, whereby rotation of the accumulator reel 32 draws film 31 from each supply reel 33. Each supply reel 33 may hold, for example, ten feet of transparent film 31. In this manner, the film 31 unwinds from the supply reels 33 and is wound unto the accumulator reel 32. In the embodiment shown, the supply reels 33 are disposed at 90-degree intervals about the housing 12/22 and the larger accumulator reel 32 is centrally positioned within the housing 12/22. Each transparent film 31 extending between a supply reel and the accumulator reel 22 passes externally across one of the windows 13/23, guide pins 35 and slots 36 directing the film 31, such that the film 31 covers the open or solid window 13/23. Any contaminating material 52 will now be deposited on the transparent films 31 and be blocked from deposition on the windows 13/23 or the sensor devices 11/12.

The window protective mechanism 30 is a mechanism which advances the films 31 across the windows 13/23 such that when there is a sufficient amount of accumulated contaminating material 52 present on the films 31 to affect the measuring accuracy of the sensor devices 11/21, the accumulator reel 32 is rotated to wind in the films 31 and thereby advance a clean segment of each film 31 into place across each window 13/23. The advancement of the film 31 across the windows 13/23 may be activated at periodic intervals. Alternatively, the amount of accumulated contamination on the exposed segments of film 31 may be determined by monitoring the sensor output to determine excessive deviation from the norm and activating the accumulator reel 33 only as needed.

In the embodiment as shown the window protection mechanism 30 consist of a single accumulator reel 32 that winds and advances all of the films 31. Alternatively, multiple powered accumulator reels 32 could be utilized, with each supply reel 33 being paired with a dedicated accumulator reel 32. This would allow the films 31 to be advanced independently.

In addition to the window protection mechanism 30, a shroud or collar can be mounted on both ends of the spray head 91, one shroud located forward of the trailing sensor assembly 20 and the other shroud to the rear of the leading sensor assembly 10. The shroud is preferably provided with a hydrophobic or oleophobic coating and rotated at high speed to expel any accumulated liner material 52. Alternatively, a blower may be provided as part of the sensor assemblies 10/20 to create high turbulence air flow to force atomized liner material 52 away from the sensor assemblies 10/20.

It is contemplated that equivalents and substitutions for certain elements described above may be obvious to those skilled in the art, and therefore the true scope and definition of the invention is to be as set forth in the following claims.

We claim:

1. A sprayer assembly adapted to create a liner on the inner wall of a pipe and measure the thickness of the liner when transported through the pipe, said sprayer apparatus comprising:
   a spray head adapted to propel a polymer resin material onto the inner wall of the pipe, said polymer resin material curing to form a liner on the inner wall of the pipe;

a leading sensor assembly mounted forward of said spray head relative to the direction of travel of said sprayer assembly through the pipe; said leading sensor assembly measuring the inner diameter of the pipe; and a trailing sensor assembly mounted to the rear of said spray head relative to the direction of travel of said sprayer assembly through the pipe; said trailing sensor assembly measuring the inner diameter of the liner;

wherein said leading sensor assembly and said trailing sensor assembly each comprise one or more sensor devices disposed within a housing, said housing having a window associated with each said sensor device; and wherein said trailing sensor assembly further comprises a window protective mechanism, said window protective mechanism comprising a movable transparent film extending across each of said windows whereby the thickness of the liner is determined by calculating the difference between the inner diameter of the pipe and the inner diameter of the liner.

2. The sprayer assembly of claim 1, wherein said trailing sensor assembly further comprises a supply reel for each of said transparent films and a powered accumulator reel, whereby said powered accumulator reel unwinds said transparent films from said supply reels and advances said transparent films across said windows.

3. The sprayer assembly of claim 1, wherein said leading sensor assembly and said trailing sensor assembly each comprise four sensor devices spaced 90 degrees apart.

4. The sprayer assembly of claim 2, wherein said supply reels are free spinning.

5. The sprayer assembly of claim 2, wherein said power accumulator is centrally located within said trailing sensor assembly.

6. The sprayer assembly of claim 3, wherein said power accumulator is centrally located within said trailing sensor assembly.

* * * * *